(12) United States Patent
Shi et al.

(10) Patent No.: US 12,532,307 B2
(45) Date of Patent: Jan. 20, 2026

(54) SMALL DATA TRANSMISSION METHOD AND APPARATUS, AND TERMINAL DEVICE

(71) Applicant: GUANGDONG OPPO MOBILE TELECOMMUNICATIONS CORP., LTD., Dongguan (CN)

(72) Inventors: Cong Shi, Dongguan (CN); Xue Lin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 364 days.

(21) Appl. No.: 18/127,328

(22) Filed: Mar. 28, 2023

(65) Prior Publication Data
US 2023/0239858 A1    Jul. 27, 2023

Related U.S. Application Data

(63) Continuation of application No. PCT/CN2020/118343, filed on Sep. 28, 2020.

(51) Int. Cl.
*H04W 72/12* (2023.01)
*H04W 72/52* (2023.01)
(Continued)

(52) U.S. Cl.
CPC ........... *H04W 72/12* (2013.01); *H04W 72/52* (2023.01); *H04W 72/542* (2023.01);
(Continued)

(58) Field of Classification Search
CPC ..... H04W 72/00; H04W 72/12; H04W 72/50; H04W 72/52; H04W 72/542;
(Continued)

(56) References Cited

U.S. PATENT DOCUMENTS

2016/0316494 A1* 10/2016 Quan ................ H04L 9/40
2020/0128484 A1    4/2020 Su et al.
(Continued)

FOREIGN PATENT DOCUMENTS

CN    107371264 A    11/2017
CN    108696934 A    10/2018
(Continued)

OTHER PUBLICATIONS

Supplemental Partial European Search Report issued in corresponding European Application No. 20954723.1, mailed on Oct. 9, 2023, 17 pages.
(Continued)

*Primary Examiner* — Warner Wong
(74) *Attorney, Agent, or Firm* — BAYES PLLC (57) ABSTRACT

Embodiments of the present application provide a small data transmission method and apparatus, and a terminal device. The method comprises: the terminal device determines a first data amount, which comprises a data amount of radio resource control (RRC) messages and a data amount of at least one data radio bearer (DRB) cache; and the terminal device determines, based on the first data amount, whether to initiate an inactive state small data transmission.

12 Claims, 3 Drawing Sheets

(51) Int. Cl.
*H04W 72/542* (2023.01)
*H04L 43/0876* (2022.01)
*H04W 16/08* (2009.01)
*H04W 24/02* (2009.01)

(52) U.S. Cl.
CPC ......... *H04L 43/0876* (2013.01); *H04W 16/08* (2013.01); *H04W 24/02* (2013.01)

(58) Field of Classification Search
CPC ..... H04W 16/08; H04W 28/08; H04W 28/09; H04W 28/0942; H04L 47/125; H04L 43/0876; H04L 43/0882
See application file for complete search history.

(56) References Cited

U.S. PATENT DOCUMENTS

| | | | |
|---|---|---|---|
| 2020/0186606 A1 | 6/2020 | Shi et al. | |
| 2020/0214073 A1* | 7/2020 | Shimoda | H04W 16/32 |
| 2020/0374966 A1 | 11/2020 | Chang et al. | |
| 2021/0105851 A1* | 4/2021 | Kim | H04W 74/0833 |
| 2021/0274525 A1* | 9/2021 | Wei | H04W 76/27 |
| 2021/0337602 A1* | 10/2021 | Liu | H04W 74/002 |
| 2022/0022266 A1* | 1/2022 | Agiwal | H04W 74/0841 |
| 2022/0046749 A1* | 2/2022 | Lin | H04W 76/30 |
| 2022/0078697 A1* | 3/2022 | Tseng | H04W 72/21 |
| 2022/0232659 A1* | 7/2022 | Kim | H04W 76/27 |
| 2022/0279594 A1* | 9/2022 | Chen | H04W 74/0866 |
| 2023/0262814 A1* | 8/2023 | Agiwal | H04W 76/30 370/329 |
| 2023/0284329 A1* | 9/2023 | Agiwal | H04W 76/27 370/331 |
| 2023/0319890 A1* | 10/2023 | Wang | H04W 76/28 370/329 |

FOREIGN PATENT DOCUMENTS

| | | | | |
|---|---|---|---|---|
| CN | 109246811 A | 1/2019 | | |
| CN | 110999404 A | 4/2020 | | |
| WO | 2019134566 A1 | 7/2019 | | |
| WO | 2020/088097 A1 | 5/2020 | | |
| WO | WO-2020221861 A1 * | 11/2020 | ............ | H04W 74/08 |
| WO | WO-2022057886 A1 * | 3/2022 | ........... | H04L 5/0053 |

OTHER PUBLICATIONS

Extended European Search Report issued in corresponding European Application No. 20954723.1, mailed on Jan. 11, 2024.
InterDigital Communications, "UE Transmissions in New State for NR", R2-166870, 3GPP TSG-RAN WG2 #95bis Kaohsiung, Oct. 10-14, 2016.
International Search Report issued in International application No. PCT/CN2020/118343, mailed Jun. 24, 2021.
Written Opinion of the International Searching Authority issued in International application No. PCT/CN2020/118343, mailed Jun. 24, 2021.
RAN2 Session chair (InterDigital), "Session minutes for NR-U, Power Savings, NTN and 2-step RACH", R2-2001664, 3GPP TSG-RAN WG2 Meeting #109 electronic Feb. 24-Mar. 6, 2020.
Intel Corporation, "SDT mechanism on RRC/non-RRC based approaches and RACH requirements", R2-2006713, 3GPP TSG RAN WG2 Meeting #111-e Electronic meeting, Aug. 17-28, 2020.
Interdigital, "RACH-based UL small data transmission procedure", R2-2007613, 3GPP RAN WG2 Meeting #111-e Aug. 17-28, 2020.
Session Chair (InterDigital), "Report for Rel-16 (NR-U, Power Savings and 2-step RACH) and Rel-17 (IIoT and Small Data)", R2-2008124, 3GPP TSG-RAN WG2 Meeting #111-e Electronic, Aug. 17-Aug. 28, 2020.
3GPP TS 38.322 V17.1.0 (Jun. 2022); Technical Specification Group Radio Access Network; NR; Radio Link Control (RLC) protocol specification (Release 17).
3GPP TS 38.323 V17.1.0 (Jun. 2022); Technical Specification Group Radio Access Network; NR; Packet Data Convergence Protocol (PDCP) specification (Release 17).

* cited by examiner

SMALL DATA TRANSMISSION METHOD AND APPARATUS, AND TERMINAL DEVICE

CROSS REFERENCE TO RELATED APPLICATION

The present application is a continuation of International Application No. PCT/CN2020/118343 filed on Sep. 28, 2020, the entire disclosure of which is incorporated herein by reference in its entirety.

TECHNICAL FIELD

Embodiments of the present disclosure relate to the field of mobile communication technologies, and more particularly, to a method and apparatus for transmitting small data, and a terminal device.

BACKGROUND

A terminal device in an inactive state may perform small data transmission, that is, Inactive Data Transmission (IDT).

The terminal device in the inactive state determines whether to initiate the inactive small data transmission based on a data volume to be transmitted and a data volume threshold. However, it is not clear how the terminal device calculates the data volume to be transmitted.

SUMMARY

Embodiments of the present disclosure provide a method and apparatus for transmitting small data, and a terminal device.

A method for transmitting small data provided by embodiments of the present disclosure includes: determining, by a terminal device, a first data volume, where the first data volume includes a data volume of a Radio Resource Control (RRC) message and a data volume buffered by at least one Data Radio Bearer (DRB); and determining, by the terminal device, whether to initiate inactive small data transmission based on the first data volume.

An apparatus for transmitting small data provided by embodiments of the present disclosure is applied to a terminal device. The apparatus includes: a determination unit, configured to determine a first data volume, where the first data volume includes a data volume of a RRC message and a data volume buffered by at least one DRB; and determine whether to initiate inactive small data transmission based on the first data volume.

A terminal device provided by embodiments of the present disclosure includes a processor and a memory. The memory is configured to store a computer program, and the processor is configured to call and run the computer program stored in the memory to perform the method for transmitting small data as described above.

A chip provided by embodiments of the present disclosure is configured to implement the method for transmitting small data as described above.

Specifically, the chip includes: a processor, configured to call and run a computer program from a memory, so that a device installed with the chip performs the method for transmitting small data as described above.

A computer-readable storage medium provided by embodiments of the present disclosure is configured to store a computer program that causes a computer to perform the method for transmitting small data as described above.

A computer program product provided by embodiments of the present disclosure includes computer program instructions, which cause a computer to perform the method for transmitting small data as described above.

A computer program provided by embodiments of the present disclosure, when running on a computer, causes a computer to perform the method for transmitting small data as described above.

Through the above technical solutions, the terminal device determines that the data volume to be transmitted (that is, the first data volume) includes the data volume of the RRC message and the data volume of the at least one DRB buffer, so as to determine the data volume to be transmitted, and determine whether to initiate the inactive small data transmission according to the data volume to be transmitted.

BRIEF DESCRIPTION OF THE DRAWINGS

The drawings described herein are used to provide further understanding of the present disclosure and constitute part of the present disclosure. Exemplary embodiments and their description of the present disclosure are used to explain the present disclosure and do not constitute any improper limitation on the present disclosure. In the drawings.

DETAILED DESCRIPTION

The technical solutions in embodiments of the present disclosure will be described below in combination with the drawings in embodiments of the present disclosure. Obviously, the described embodiments are part of embodiments of the present disclosure, rather than all the embodiments. Based on embodiments in the present disclosure, all other embodiments acquired by a person of ordinary skill in the art without creative work shall fall within the protection scope of the present disclosure.

The technical solutions according to embodiments of the present disclosure may be applied to a variety of communications systems, such as a Long Term Evolution (LTE) system, an LTE Frequency Division Duplex (FDD) system, an LTE Time Division Duplex (TDD) system, a 5G communication system, or a future communication system, etc.

Figure 1:
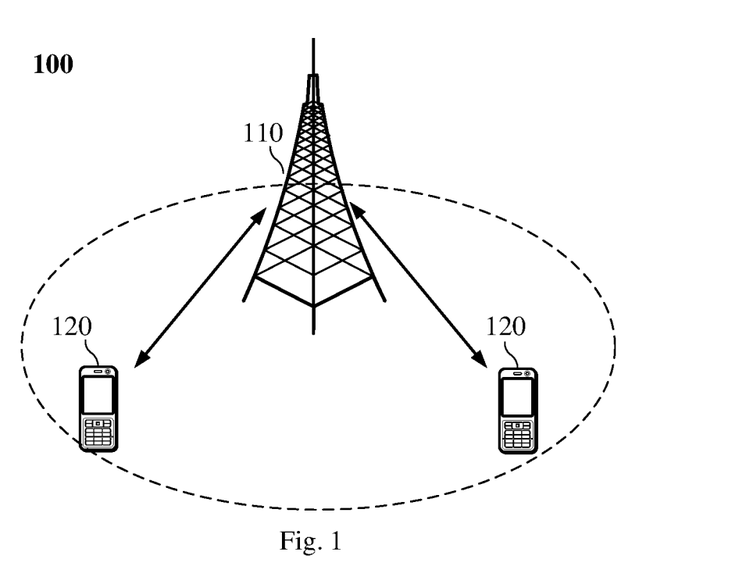
FIG. 1 is a schematic architectural diagram of a communication system provided by an embodiment of the present disclosure.

Exemplarily, a communication system 100 applied in embodiments of the present disclosure is shown in FIG. 1. The communication system 100 may include a network device 110. The network device 110 may be a device in communication with a terminal 120 (also referred to as a communication terminal or user equipment). The network device 110 may provide communication coverage over a specific geographic region, and may communicate with the terminal located within the coverage region. Optionally, the network device 110 may be an evolutional node B (eNB or eNodeB) in a long term evolution (LTE) system, or a radio controller in a cloud radio access network (CRAN). Alternatively, the network device may be a mobile switching center, a relay station, an access point, a vehicle device, a wearable device, a concentrator, a switchboard, a network bridge, a router, a network-side device in a 5th generation (5G) network, or a network device in a future communication system, and the like.

The communication system 100 further includes at least one terminal 120 located within a coverage range of the network device 110. The "terminal" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network, and an AM-FM broadcast transmitter; and/or an apparatus of another terminal, which is configured to receive/transmit a communication signal; and/or an Internet of things (IoT) device. The terminal configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a personal digital assistant (PDA) that may include a radiotelephone, a pager, an Internet/intranet access, a Web browser, a notepad, a calendar, and/or a global positioning system (GPS) receiver; and a conventional laptop and/or palmtop receiver or other electronic apparatuses including radiotelephone transceivers. The terminal may refer to an access terminal, a User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having wireless communication function, a computation device or other processing devices connected to a radio modem, a vehicle device, a wearable device, a terminal in a 5G network, or a terminal in the PLMN that will be evolved in the future, and the like.

Optionally, device to device (D2D) communication may be realized among the terminals 120.

Optionally, a 5G communication system or 5G network may also be referred to as a new radio (NR) system or NR network.

FIG. 1 exemplarily shows one network device and two terminals. Optionally, the communication system 100 may include a plurality of network devices, and a coverage range of each network device may include other numbers of terminals, which is not limited by embodiments of the present disclosure.

Optionally, the communication system 100 may also include other network entities such as a network controller and a mobile management entity, which is not limited by embodiments of the present disclosure.

It should be understood that a device having communication function in a network/system according to embodiments of the present disclosure may be referred to as a communication device. The communication system 100 shown in FIG. 1 is taken as an example. The communication device may include a network device 110 and a terminal 120 both having communication functions. The network device 110 and the terminal 120 may be the above-mentioned specific devices, and descriptions thereof are omitted here. The communication device may also include other devices in the communication system 100, such as other network entities including the network controller, the mobile management entity, and the like, which is not limited by embodiments of the present disclosure.

It should be understood that the terms "system" and "network" herein may often be interchanged herein. The term "and/or" herein only indicates an association relationship that describes associated objects, and represents that there may be three relationships. For example, A and/or B may represent cases where A exists alone, A and B exist simultaneously, and B exists alone. In addition, the character "/" herein generally indicates that proceeding and following objects associated thereby are in an "or" relationship.

To facilitate understanding of the technical solutions in embodiments of the present disclosure, the following describes the technical solutions related to embodiments of the present disclosure.

With pursuit of people for rate, latency, high-speed mobility and energy efficiency, and with diversity and complexity of services in the future life, the 3rd Generation Partnership Project (3GPP) as the international standards organization has started the development of 5G. Main application scenarios of 5G include enhanced Mobile Broadband (eMBB), Ultra-Reliable Low-latency Communications (URLLC), and massive Machine-Type Communications (mMTC).

On one hand, the eMBB still aims at obtaining multimedia contents, services and data by a user, and the demand thereof increases very quickly. On the other hand, since the eMBB may be deployed in different scenarios, for example, indoors, urban areas, rural areas, etc., the difference in capability and demand thereof is also relatively large. Thus, it cannot be generically concluded, and specific deployment scenarios must be analyzed in detail. Typical applications of URLLC include: industrial automation, power automation, a remote medical operation (surgery), traffic safety, etc. Typical features of mMTC include: high connection density, small data volume, delay insensitive services, low cost and long service life of modules, etc.

In order to reduce air interface signaling, quickly recover wireless connection and quickly recover data service in a 5G network environment, a new RRC state, namely a RRC inactive (RRC_INACTIVE) state, is defined. This state is different from a RRC idle (RRC_IDLE) state and a RRC active (RRC_ACTIVE) state.

RRC_IDLE state (idle state for short): mobility is based on cell selection and reselection. Paging is initiated by a Core Network (CN), and a paging area is configured by CN. There is no terminal device context on a base station side, and there is no RRC connection.

RRC_INACTIVE state (inactive state for short): mobility is based on cell selection and reselection. There is a connection between CN-NR, and the terminal device context exists on a certain base station. Paging is triggered by a RAN, and a RAN-based paging area is managed by RAN. The network side knows that a position of the terminal device is based on a paging area level of the RAN.

RRC_CONNECTED state (connected state for short): there is a RRC connection, and there is the terminal device context on the base station side and the terminal device side. The network side knows that the position of the terminal device is at a specific cell level. The Mobility is mobility controlled by the network side. Unicast data may be transmitted between the terminal device and the base station.

The above three RRC states may be switched to each other. Some RRC parameters on the terminal device side in the inactive state are configured through RRC release messages. Main RRC parameters are as follows:

inactive RNTI (I-RNTI), used to identify a terminal device inactive context of the terminal device on the base station side, and being unique within the base station;

RAN Notification Area (RNA), being an area used to control the terminal device to perform cell selection and reselection in the inactive state, and also a paging range area of the RAN initial paging;

RAN paging cycle, used to calculate a paging occasion of the RAN initial paging; and Next hop chaining counter (NCC), used to determine a secret key used in a RRC connection recovery process.

When the terminal device moves in the RNA area, it does not need to notify the network side, and follows a mobility behavior in the RRC idle state, that is, cell selection and reselection principle. When the terminal device moves out of the paging area configured by the RAN, the terminal device triggers a RRC recovery procedure, and re-acquires the paging area configured by the RAN. When the network side needs to transmit data to the terminal device, that is, upon arrival of downlink data, a base station that saves the terminal device context will trigger all the cells in the RAN paging area to send paging messages to the terminal device, so that the inactive terminal device can recover the RRC connection to receive data. In addition, the terminal device in the inactive state is configured with the RAN paging area, in which area, the terminal device needs to perform periodic position update according to a cycle configured by the network, in order to ensure reachability of the terminal device. Scenarios that trigger the terminal device to perform the RNA update include the RNAU timer time-out or the terminal device moving to an area outside the RNA.

The terminal device in the inactive state may perform small data transmission, that is, inactive small data transmission. The inactive small data transmission supports three types of data transmission, as below:

data transmission based on a 4-step random access procedure;

data transmission based on a 2-step random access procedure; and data transmission based on Configured Grant (CG).

The terminal device in the inactive state determines whether to initiate the inactive small data transmission based on a data volume to be transmitted and a data volume threshold. However, it is not clear how the terminal device calculates the data volume to be transmitted. In a LTE User Plane-Early Data Transmission (UP-EDT) scheme, the terminal device determines the data volume to be transmitted based on its own implementation. However, this method does not give an explicit definition about a size of the data volume. That is, there is uncertainty in how the terminal device calculates the data volume to be transmitted. To this end, the following technical solutions according to embodiments of the present disclosure are proposed, and the technical solutions according to embodiments of the present disclosure provide an explicit way for determining the size of the data volume to be transmitted.

Figure 2:
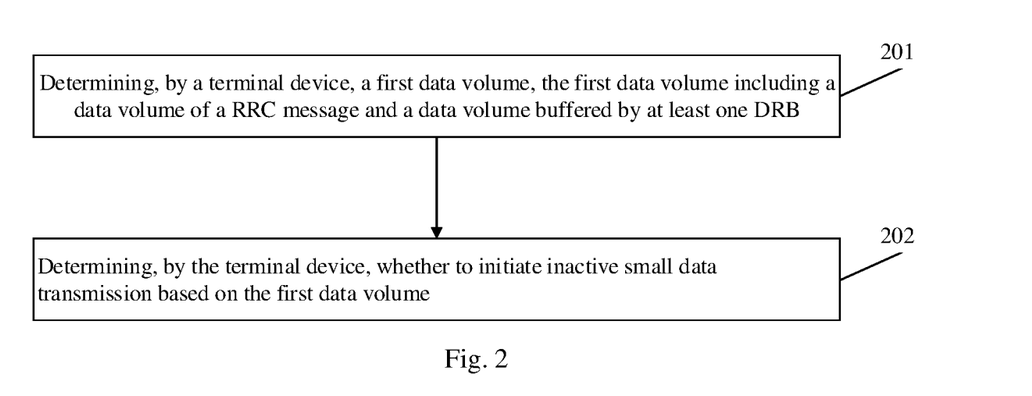
FIG. 2 is a first schematic flowchart of a method for transmitting small data provided by an embodiment of the present disclosure.

FIG. 2 is a first schematic flowchart of a method for transmitting small data provided by an embodiment of the present disclosure. As shown in FIG. 2, the method for transmitting small data includes the following steps 201 to 202.

In step 201, a terminal device determines a first data volume, where the first data volume includes a data volume of a RRC message and a data volume buffered by at least one DRB.

In embodiments of the present disclosure, the first data volume is a data volume to be transmitted by the terminal device. Here, the data volume to be transmitted by the terminal device is used to characterize a size of a MAC PDU to be transmitted.

In embodiments of the present disclosure, the first data volume includes the data volume of the RRC message and the data volume buffered by the at least one DRB.

Further optionally, the first data volume further includes a data volume of at least one Media Access Control Control Element (MAC CE).

Further optionally, the first data volume further includes a data volume of a header corresponding to at least one protocol layer. Here, the header corresponding to the at least one protocol layer includes: a Media Access Control (MAC) header, a Radio Link Control (RLC) header, and a Packet Data Convergence Protocol (PDCP) header.

In an example, the first data volume is equal to the data volume of the RRC message plus the data volume buffered by the at least one DRB.

In an example, the first data volume is equal to the data volume of the RRC message plus the data volume buffered by the at least one DRB and further plus the data volume of the at least one MAC CE.

In an example, the first data volume is equal to the data volume of the RRC message plus the data volume buffered by the at least one DRB and further plus the data volume of the at least one MAC CE and further plus the data volume of the header corresponding to the at least one protocol layer.

Each constituent part of the first data volume in the above solution will be described in detail below.

The Data Volume of the RRC Message

In an optional embodiment, the RRC message is a RRC connection recovery request message.

The Data Volume Buffered by the at Least One DRB

In embodiments of the present disclosure, the at least one DRB may be implemented in two manners, which are described below.

The terminal device has N DRBs, where N is a positive integer. The terminal device receives RRC-specific signaling sent by a network device, the RRC-specific signaling carries first indication information, and the first indication information is used for indicating that M DRBs among the N DRBs support the inactive small data transmission, where M is a positive integer less than or equal to N.

A) Manner 1: the at Least One DRB is the M DRBs

In Manner 1, the first data volume includes a data volume buffered by a DRB of the terminal device that supports the inactive small data transmission.

As an example, the first data volume is equal to the data volume of the RRC message plus the data volume buffered by the M DRBs and further plus the data volume of the at least one MAC CE.

B) Manner 2: the at Least One DRB is the N DRBs

In Manner 2, the first data volume includes a data volume buffered by all the DRBs of the terminal device.

As an example, the first data volume is equal to the data volume of the RRC message plus the data volume buffered by the N DRBs and further plus the data volume of the at least one MAC CE.

In the above solution, the data volume buffered by the at least one DRB includes a data volume buffered by each DRB of the at least one DRB, and the data volume buffered by each DRB includes PDCP buffer data volume and/or RLC buffer data volume.

In an optional embodiment, the PDCP buffer data volume includes at least one of the following:

1) A Data Volume of at Least One PDCP SDU

Here, the PDCP SDU has the following characteristics: a PDCP layer receives the PDCP SDU from an upper layer, and the PDCP SDU has not been constructed as a corresponding PDCP data PDU.

2) A Data Volume of at Least One PDCP Data PDU

Here, the PDCP data PDU has the following characteristics: after the PDCP layer constructs the PDCP data PDU, the PDCP data PDU has not been transmitted to a lower layer.

3) A Data Volume of at Least One PDCP Control PDU

In an optional embodiment, the RLC buffer data volume includes at least one of the following:

1) A Data Volume of at Least One RLC SDU

Here, the RLC SDU has the following characteristics: the RLC layer receives the RLC SDU from an upper layer, the RLC SDU does not need to be segmented, and the RLC SDU has not been included into a corresponding RLC data PDU.

2) A Data Volume of at Least One RLC SDU Segment

Here, the RLC SDU segment has the following characteristics: the RLC layer receives the RLC SDU from the upper layer, and the RLC SDU needs to be segmented into RLC SDU segments, which have not been included in a corresponding RLC data PDU.

3) A Data Volume of at Least One RLC Data PDU

Here, the RLC data PDU has the following characteristics: after the RLC layer constructs the RLC data PDU, the RLC data PDU is in a pending state for initial transmission. The Data Volume of the at Least One MAC CE In an optional embodiment, the at least one MAC CE includes a BSR MAC CE, and the BSR MAC CE here refers to a MAC CE for carrying a Buffer Status Report (BSR).

In step 202, the terminal device determines whether to initiate the inactive small data transmission based on the first data volume.

In an optional embodiment, if the first data volume is less than or equal to a first threshold, it is determined to initiate the inactive small data transmission.

In another optional embodiment, if the first data volume is less than or equal to the first threshold, and a channel quality measurement value measured by the terminal device is greater than or equal to a second threshold, it is determined to initiate the inactive small data transmission.

Here, the channel quality may be optionally a Reference Signal Received Power (RSRP) or a Reference Signal Received Quality (RSRQ).

In embodiments of the present disclosure, the terminal device receives a system message sent by the network device, and the system message includes at least one data volume threshold and/or at least one channel quality threshold. The at least one data volume threshold is used for determining the first threshold, and the at least one channel quality threshold is used for determining the second threshold.

In an example, in a case where the network device configures one data volume threshold through the system message, this data volume threshold is the first threshold.

In an example, in a case where the network device configures a plurality of data volume thresholds through the system message, the terminal device may select one data volume threshold from the plurality of data volume thresholds as the first threshold. For example, the terminal device selects the smallest data volume threshold or the largest data volume threshold as the first threshold. Alternatively, the terminal device compares the first data volume with the plurality of data volume thresholds, respectively, determines at least one data volume threshold that satisfies a condition, and reports the at least one data volume threshold or the smallest value among the at least one data volume threshold to the network device. Here, satisfying a condition means that the first data volume is less than or equal to the data volume threshold.

In an example, in a case where the network device configures one channel quality threshold through the system message, this channel quality threshold is the second threshold.

In an example, in a case where the network device configures a plurality of channel quality threshold through the system message, the terminal device may select one channel quality threshold from the plurality of channel quality thresholds as the second threshold. For example, the terminal device selects the smallest channel quality threshold or the largest channel quality threshold as the second threshold. Alternatively, the terminal device compares the channel quality measurement value with the plurality of channel quality thresholds, respectively, determines at least one channel quality threshold that satisfies a condition, and reports the at least one channel quality threshold or the largest value among the at least one channel quality threshold to the network device. Here, satisfying a condition means that the channel quality measurement value is greater than or equal to the channel quality threshold.

In an example, in a case where the system message includes one data volume threshold and a plurality of channel quality thresholds, the one data volume threshold is the first threshold, and the terminal device compares the first data volume with the data volume threshold. If the first data volume is less than or equal to the data volume threshold, the terminal device compares the channel quality measurement value with the plurality of channel quality thresholds, and determines the second threshold that is less than or equal to the channel quality measurement value from the plurality of channel quality thresholds. The terminal device indicates the second threshold to the network device.

Here, if one channel quality threshold that is less than or equal to the channel quality measurement value is determined from the plurality of channel quality thresholds, this channel quality threshold is the second threshold. If multiple channel quality thresholds that are less than or equal to the channel quality measurement value are determined from the plurality of channel quality thresholds, the largest value among the multiple channel quality thresholds is used as the second threshold.

In the above solution, indication of the second threshold to the network device by the terminal device may be implemented in the following manners.

I) an implicit manner, where the terminal device sends a first preamble to the network device on a first random access resource, and the first random access resource and/or the first preamble are used for indicating the second threshold.

Here, the random access resource may be a RO resource.

The random access resource and/or the preamble have a correspondence relationship with the threshold, and the second threshold may be implicitly indicated by selecting the specific first random access resource and/or first preamble.

II) an explicit manner, where the terminal device sends second indication information to the network device, and the second indication information is used for indicating the second threshold.

Here, the second indication information may be optionally carried in the MAC CE.

It should be noted that the network device in embodiments of the present disclosure may be a base station, such as a gNB.

Figure 3:
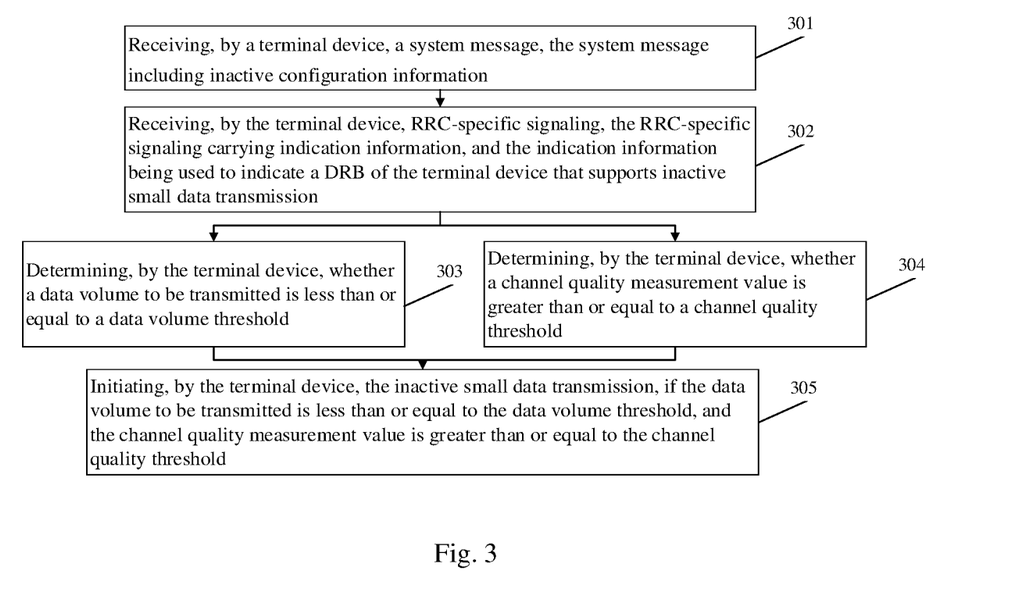
FIG. 3 is a second schematic flowchart of a method for transmitting small data provided by an embodiment of the present disclosure.

FIG. 3 is a second schematic flowchart of a method for transmitting small data provided by an embodiment of the present disclosure. As shown in FIG. 3, the method for transmitting small data includes the following steps 301 to 305.

In step 301, a terminal device receives a system message, where the system message includes inactive configuration information.

Here, the inactive configuration information includes indication information, and the indication information is used for indicating that a current cell supports inactive small data transmission. Further, the inactive configuration information further includes a parameter related to the inactive small data transmission, including but not limited to at least one of the following: a random access configuration parameter, at least one data volume threshold, and at least one channel quality threshold.

In step 302, the terminal device receives RRC-specific signaling, where the RRC-specific signaling carries indication information, and the indication information is used for indicating a DRB of the terminal device that supports the inactive small data transmission.

In step 303, the terminal device determines whether the data volume to be transmitted is less than or equal to a data volume threshold.

Here, the data volume to be transmitted is the first data volume, and a method for calculating the first data volume may refer to the aforementioned related solutions.

In step 304, the terminal device determines whether a channel quality measurement value is greater than or equal to a channel quality threshold.

In step 305, if the data volume to be transmitted is less than or equal to the data volume threshold, and the channel quality measurement value is greater than or equal to the channel quality threshold, the terminal device initiates the inactive small data transmission.

In the technical solutions according to embodiments of the present disclosure, the terminal device initiating the inactive small data transmission means that the terminal device will transmit the data to be transmitted by means of the inactive small data transmission. Specifically, the inactive small data transmission supports three types of data transmission, namely: data transmission based on 4-step random access procedure, data transmission based on 2-step random access procedure, and data transmission based on CG.

The technical solutions according to embodiments of the present disclosure are exemplified below in conjunction with specific application examples.

Application Example 1

The terminal device has four DRBs, which are DRB #1, DRB #2, DRB #3 and DRB #4, respectively. The terminal device receives RRC-specific signaling (such as RRC release message), and the RRC-specific signaling is used to configure DRB #1 and DRB #2 to support the inactive small data transmission, and configure DRB #3 and DRB #4 to not support the inactive small data transmission.

When DRB #1 and/or DRB #2 have buffered data, the terminal device calculates that the data volume to be transmitted includes the data volume of the RRC message and a data volume buffered by DRB #1 and/or DRB #2. Optionally, the data volume to be transmitted further includes the data volume of a potential MAC CE and the data volume of a header corresponding to at least one protocol layer. The calculated data volume to be transmitted is the size of the MAC PDU. The data volume to be transmitted is compared with the data volume threshold, and in the meantime, a RSRP measurement value is also compared with the RSRP threshold. If the data volume to be transmitted is less than or equal to the data volume threshold and the RSRP measurement value is greater than or equal to the RSRP threshold, the terminal device determines to initiate the inactive small data transmission. Here, the small data includes one MAC PDU, and this MAC PDU contains the RRC message, data to be transmitted of DRB #1 and/or DRB #2, and a potential MAC CE.

Application Example 2

Embodiment 2 (A DRB with the Buffered Data is not Configured with SDT)

The terminal device has four DRBs, which are DRB #1, DRB #2, DRB #3 and DRB #4, respectively. The terminal device receives RRC-specific signaling (such as RRC release message), and the RRC-specific signaling is used to configure DRB #1 and DRB #2 to support the inactive small data transmission, and configure DRB #3 and DRB #4 to not support the inactive small data transmission.

A) when DRB #3 or DRB #4 has buffered data, the terminal device directly initiates the RRC connection recovery procedure, and sends the data to be transmitted after connecting to the RRC connection, B) Alternatively, when DRB #3 or DRB #4 has the data buffer, and DRB #1 and/or DRB #2 also has the data buffer, the terminal device calculates the data volume to be transmitted that includes the data volume of the RRC message, a data volume buffered by DRB #3 or DRB #4, and the data volume buffered by DRB #1 and/or DRB #2. Optionally, the data volume to be transmitted further includes the data volume of a potential MAC CE and the data volume of a header corresponding to at least one protocol layer. The calculated data volume to be transmitted is the size of the MAC PDU. The data volume to be transmitted is compared with the data volume threshold, and in the meantime, a RSRP measurement value is also compared with the RSRP threshold. If the data volume to be transmitted is less than or equal to the data volume threshold and the RSRP measurement value is greater than or equal to the RSRP threshold, the terminal device determines to initiate the inactive small data transmission. Further, the terminal device may indicate to the network through signaling (such as BSR) that DRB #3 or DRB #4 has buffered data.

Figure 4:
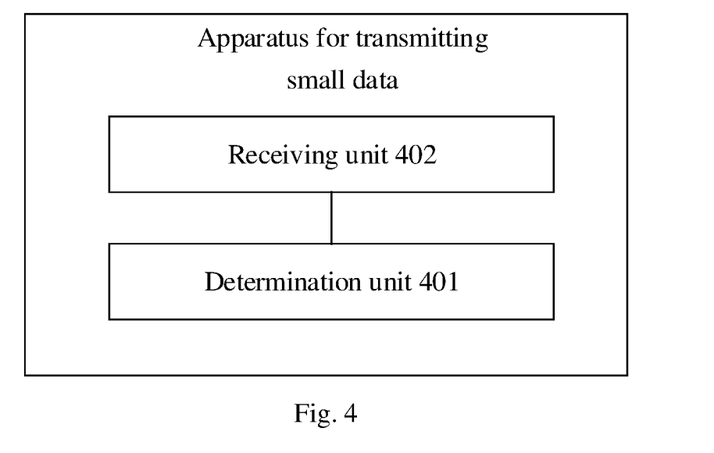
FIG. 4 is a schematic structural diagram of components of an apparatus for transmitting small data provided by an embodiment of the present disclosure.

FIG. 4 is a schematic structural diagram of components of an apparatus for transmitting small data provided by an embodiment of the present disclosure. The apparatus is applied to a terminal device. As shown in FIG. 4, the apparatus for transmitting the small data includes: a determination unit 401, configured to determine a first data volume, where the first data volume includes a data volume of a RRC message and a data volume buffered by at least one DRB; and determine whether to initiate inactive small data transmission based on the first data volume.

In an optional embodiment, the first data volume further includes a data volume of at least one MAC CE.

In an optional embodiment, the first data volume further includes a data volume of a header corresponding to at least one protocol layer.

In an optional embodiment, the header corresponding to the at least one protocol layer includes: a MAC header, a RLC header, and a PDCP header.

In an optional embodiment, the terminal device has N DRBs, where N is a positive integer. The apparatus further includes: a receiving unit 402, configured to receive RRC-specific signaling sent by a network device. The RRC-specific signaling carries first indication information, and the first indication information is used for indicating that M DRBs among the N DRBs support the inactive small data transmission, where M is a positive integer less than or equal to N.

In an optional embodiment, the at least one DRB is the M DRBs.

In an optional embodiment, the at least one DRB is the N DRBs.

In an optional embodiment, the data volume buffered by the at least one DRB includes a data volume buffered by each DRB of the at least one DRB, and the data volume buffered by each DRB includes PDCP buffer data volume and/or RLC buffer data volume.

In an optional embodiment, the PDCP buffer data volume includes at least one of the following: a data volume of at least one PDCP SDU; a data volume of at least one PDCP data PDU; and a data volume of at least one PDCP control PDU.

In an optional embodiment, the RLC buffer data volume includes at least one of the following: a data volume of at least one RLC SDU; a data volume of at least one RLC SDU segment; and a data volume of at least one RLC data PDU.

In an optional embodiment, the determination unit 401 is configured to: determine to initiate the inactive small data transmission if the first data volume is less than or equal to a first threshold; or determine to initiate the inactive small data transmission if the first data volume is less than or equal to the first threshold and a channel quality measurement value measured by the terminal device is greater than or equal to a second threshold.

In an optional embodiment, the apparatus further includes: a receiving unit 402, configured to receive a system message sent by the network device, where the system message includes at least one data volume threshold and/or at least one channel quality threshold.

The at least one data volume threshold is used for determining the first threshold, and the at least one channel quality threshold is used for determining the second threshold.

In an optional embodiment, the system message includes one data volume threshold and a plurality of channel quality thresholds, and the one data volume threshold is the first threshold.

The apparatus further includes: a comparison unit (not shown in the figure), configured to: compare the first data volume with the data volume threshold; and if the first data volume is less than or equal to the data volume threshold, compare the channel quality measurement value with the plurality of channel quality thresholds.

The determination unit 401 is further configured to determine the second threshold that is less than or equal to the channel quality measurement value from the plurality of channel quality thresholds.

The apparatus further includes: an indication unit (not shown in the figure), configured to indicate the second threshold to the network device.

In an optional embodiment, the indication unit is configured to: send a first preamble to the network device on a first random access resource, where the first random access resource and/or the first preamble are used for indicating the second threshold; or send second indication information to the network device, where the second indication information is used for indicating the second threshold.

In an optional embodiment, the RRC message is a RRC connection recovery request message.

Those skilled in the art shall understand that the relevant description of the above apparatus for transmitting small data in embodiments of the present disclosure can be understood with reference to the relevant description of the method for transmitting small data in embodiments of the present disclosure.

Figure 5:
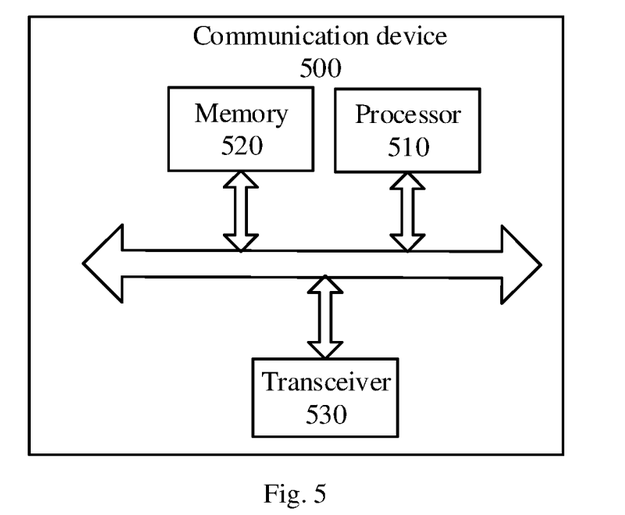
FIG. 5 is a schematic structural diagram of a communication device provided by an embodiment of the present disclosure.

FIG. 5 is a schematic structural diagram of a communication device 500 provided by an embodiment of the present disclosure. The communication device may be a terminal device, and the communication device 500 shown in FIG. 5 includes a processor 510. The processor 510 may call a computer program from a memory and run the computer program, to implement the method in embodiments of the present disclosure.

Optionally, as shown in FIG. 5, the communication device 500 may further include a memory 520. The processor 510 may call the computer program from the memory 520 and run the computer program, to implement the method in embodiments of the present disclosure.

The memory 520 may be a separate component independent of the processor 510, or may be integrated into the processor 510.

Optionally, as shown in FIG. 5, the communication device 500 may further include a transceiver 530. The processor 510 may control the transceiver 530 to communicate with another device. Specifically, the transceiver 530 may transmit information or data to another device, or receive information or data transmitted by another device.

The transceiver 530 may include a transmitter and a receiver. The transceiver 530 may further include an antenna. There may be one or more antennas.

Optionally, the communication device 500 may be the network device in embodiments of the present disclosure, and the communication device 500 may implement respective procedures performed by the network device in various methods according to embodiments of the present disclosure. For brevity, details are not described herein again.

Optionally, the communication device 500 may be the mobile device/terminal device in embodiments of the present disclosure, and the communication device 500 may implement respective procedures performed by the mobile device/terminal device in various methods according to embodiments of the present disclosure. For brevity, details are not described herein again.

Figure 6:
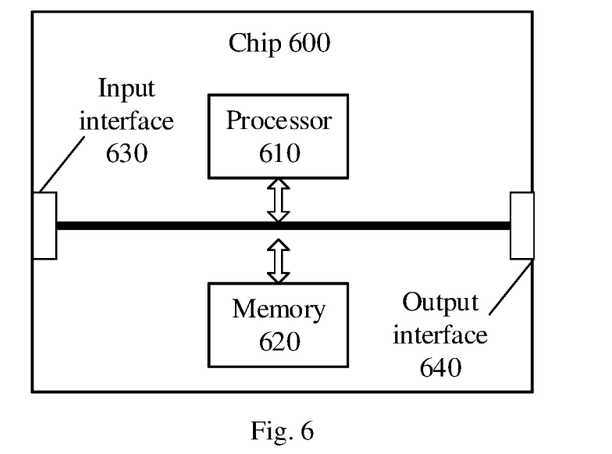
FIG. 6 is a schematic structural diagram of a chip according to an embodiment of the present disclosure.

FIG. 6 is a schematic structural diagram of a chip according to an embodiment of the present disclosure. The chip 600 shown in FIG. 6 includes a processor 610 which can call and run a computer program from a memory to implement the method according to embodiments of the present disclosure.

Optionally, as shown in FIG. 6, the chip 600 may further include a memory 620. The processor 610 can call and run the computer program from the memory 620 to carry out the method in embodiments of the present disclosure.

The memory 620 may be a separate device independent of the processor 610, or may be integrated in the processor 610.

Optionally, the chip 600 may further include an input interface 630. The processor 610 can control the input interface 630 to communicate with other devices or chips, and specifically, to acquire information or data transmitted by other devices or chips.

Optionally, the chip 600 may further include an output interface 640. The processor 610 can control the output interface 640 to communicate with other devices or chips, and specifically, to output information or data to other devices or chips.

Optionally, the chip may be applied to the network device in embodiments of the present disclosure, and the chip can implement respective procedures performed by the network device in various methods according to embodiments of the present disclosure. For brevity, details are not described herein again.

Optionally, the chip may be applied to the mobile device/terminal device in embodiments of the present disclosure, and the chip can implement respective procedures performed by the mobile device/terminal device in various methods according to embodiments of the present disclosure. For brevity, details are not described herein again.

It should be understood that, the chip mentioned in embodiments of the present disclosure may be referred as to a system-level chip, a system chip, a chip system, or a system-on-chip.

Figure 7:
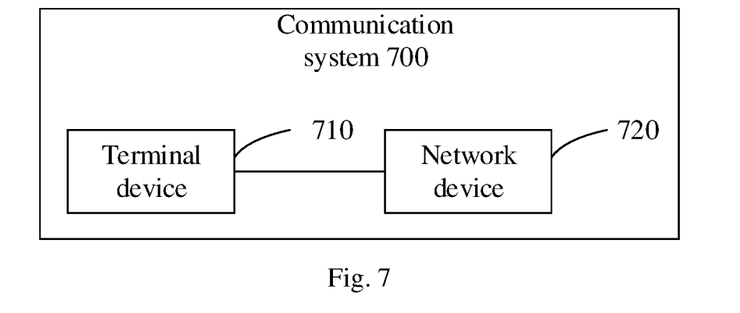
FIG. 7 is a schematic block diagram of a communication system provided by an embodiment of the present disclosure.

FIG. 7 is a schematic block diagram of a communication system 700 provided by an embodiment of the present disclosure. As shown in FIG. 7, the communication system 700 includes a terminal device 710 and a network device 720.

The terminal device 710 may be configured to implement respective functions performed by the terminal device in the above method. The network device 720 may be configured to implement respective functions performed by the network device in the above method. For brevity, details are not described herein again.

It is to be understood that the processor in embodiments of the present disclosure may be an integrated circuit chip and has a signal processing capability. In an implementation, the steps in the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA), other programmable logical device, a discrete gate, a transistor logical device, or a discrete hardware component, which may implement or perform the methods, operations and logical block diagrams disclosed in embodiments of the present disclosure. The universal processor may be a microprocessor, or the processor may also be any conventional processor and the like. The steps of the methods disclosed in combination with embodiments of the present disclosure may be directly embodied as being executed and completed by a hardware decoding processor or executed and completed by a combination of hardware and software modules in the decoding processor. The software modules may be located in a mature storage medium in the art, such as a Random Access Memory (RAM), a flash memory, a Read-Only memory (ROM), a Programmable ROM (PROM), Electrically Erasable PROM (EEPROM) or a register. The storage medium is located in a memory, the processor reads information in the memory, and completes steps of the methods in combination with hardware.

It can be understood that the memory in embodiments of the present disclosure may be a volatile memory or a nonvolatile memory, or may include both the volatile and nonvolatile memories. The nonvolatile memory may be a ROM, a PROM, an Erasable PROM (EPROM), an Electrically EPROM (EEPROM) or a flash memory. The volatile memory may be a RAM, and is used as an external high-speed cache. By way of exemplary illustration but not limitation, RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DR RAM). It is to be noted that the memory in the systems and methods described in the present disclosure is intended to include, but is not limited to, memories of these and any other proper types.

It should be understood that the foregoing memory is exemplary rather than limiting. For example, the memory in embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in embodiments of the present disclosure is intended to include but is not limited to those and any other suitable types of memories.

Embodiments of the present disclosure further provide a computer-readable storage medium. The computer-readable storage medium is configured to store a computer program.

Optionally, the computer-readable storage medium may be applied to the network device in embodiments of the present disclosure, and the computer program causes a computer to carry out respective processes implemented by the network device in various methods according to embodiments of the present disclosure. For the sake of brevity, details are not described herein again.

Optionally, the computer-readable storage medium may be applied to the mobile terminal/terminal device in embodiments of the present disclosure, and the computer program causes a computer to carry out respective processes implemented by the mobile terminal/terminal device in various methods according to embodiments of the present disclosure. For the sake of brevity, details are not described herein again.

Embodiments of the present disclosure further provide a computer program product that includes computer program instructions.

Optionally, the computer program product may be applied to the network device in embodiments of the present disclosure, and the computer program instructions cause a computer to carry out respective processes implemented by the network device in various methods according to embodiments of the present disclosure. For the sake of brevity, details are not described herein again.

Optionally, the computer program product may be applied to the mobile terminal/terminal device in embodiments of the present disclosure, and the computer program instructions cause a computer to carry out respective processes implemented by the mobile terminal/terminal device in various methods according to embodiments of the present disclosure. For the sake of brevity, details are not described herein again.

Embodiments of the present disclosure further provide a computer program.

Optionally, the computer program may be applied to the network device in embodiments of the present disclosure. When running on a computer, the computer program causes the computer to carry out respective processes implemented by the network device in various methods according to embodiments of the present disclosure. For the sake of brevity, details are not described herein again.

Optionally, the computer program may be applied to the mobile terminal/terminal device in embodiments of the present disclosure. When running on a computer, the computer program causes the computer to carry out respective processes implemented by the mobile terminal/terminal device in various methods according to embodiments of the present disclosure. For the sake of brevity, details are not described herein again.

Those of ordinary skill in the art will appreciate that the exemplary units and algorithm steps described in connection with embodiments disclosed herein may be carried out by electronic hardware or a combination of electronic hardware and computer software. Whether the functions are implemented by hardware or software depends on particular applications and design constraints of the technical solutions. A person skilled in the art may use a different method to implement the described functions for each of the particular applications, and such implementation should not be considered as going beyond the scope of the present disclosure.

It may be clearly understood by a person skilled in the art that, for the purpose of convenient and brief description, with respect to a detailed working process of the system, device, and unit, reference may be made to a corresponding process in the foregoing method embodiments, details of which are not described herein again.

According to embodiments provided by the present disclosure, it should be understood that the disclosed systems, devices and methods may be implemented in other ways. For example, the device embodiments described above are merely illustrative. For example, the division of units is only a kind of logical function division. In practice implementations, there may be other divisions. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may be or may not be physically separated, and the parts displayed as units may be or may not be physical units. That is, the units may be located in one place, or may be distributed over multiple network units. Some or all of the units may be selected according to actual needs to achieve the objectives of the solutions in embodiments.

In addition, individual functional units in each embodiment of the present disclosure may be integrated in one processing unit, or the units may exist alone physically, or two or more units may be integrated in one unit.

The functions may also be stored in a computer-readable storage medium if being implemented in the form of software functional unit and sold or used as an independent product. Based on such understanding, the essence of the technical solutions of the present disclosure, or the part contributing to the prior art or part of the technical solutions, may be embodied in the form of software product. The computer software product is stored in a storage medium and includes instructions to cause a computer device (which may be a personal computer, a server, or a controlling device, etc.) to perform all or part of steps of the methods described in embodiments of the present disclosure. The foregoing storage medium includes any medium that is capable of storing program codes, such as a USB disk, a mobile hard disk, a Read-Only Memory (ROM), a Random Access Memory (RAM), a magnetic disk, an optical disk, or the like.

Those described above are merely specific embodiments of the present disclosure, and the protection scope of the present disclosure is not limited thereto. Any change or substitution that is readily conceived of by a person skilled in the art within the technical scope disclosed in the present disclosure shall fall within the protection scope of the present disclosure. Therefore, the protection scope of the present disclosure should be defined by the appended claims.

What is claimed is:

1. A method for transmitting small data, comprising:
    determining, by a terminal device, a first data volume, wherein the first data volume comprises a data volume of a Radio Resource Control (RRC) message and a data volume buffered by at least one Data Radio Bearer (DRB); and
    determining, by the terminal device, whether to initiate inactive small data transmission based on the first data volume,
    wherein the determining, by the terminal device, whether to initiate the inactive small data transmission based on the first data volume comprises:
    determining to initiate the inactive small data transmission, if the first data volume is less than or equal to the first threshold and a channel quality measurement value measured by the terminal device is greater than or equal to a second threshold,
    wherein the method further comprises:
    receiving, by the terminal device, a system message sent by a network device,
    wherein the system message comprises one data volume threshold and a plurality of channel quality thresholds, the one data volume threshold being the first threshold; and
    the method further comprises:
    comparing, by the terminal device, the first data volume with the data volume threshold;
    if the first data volume is less than or equal to the data volume threshold, comparing, by the terminal device, the channel quality measurement value with the plurality of channel quality thresholds, and determining, by the terminal device, the second threshold that is less than or equal to the channel quality measurement value from the plurality of channel quality thresholds; and
    indicating, by the terminal device, the second threshold to the network device.

2. The method according to claim 1, wherein
    the terminal device has N DRBs, where N is a positive integer; and
    the method further comprises:
    receiving, by the terminal device, RRC-specific signaling sent by the network device, wherein the RRC-specific signaling carries first indication information, and the first indication information is used for indicating that M DRBs among the N DRBs support the inactive small data transmission, where M is a positive integer less than or equal to N.

3. The method according to claim 2, wherein the at least one DRB is the M DRBs.

4. The method according to claim 1, wherein the data volume buffered by the at least one DRB comprises a data volume buffered by each DRB of the at least one DRB, and the data volume buffered by each DRB comprises PDCP buffer data volume and/or RLC buffer data volume.

5. A terminal device, comprising: a processor and a memory, wherein the memory is configured to store a computer program, and the processor is configured to call and run the computer program stored in the memory to perform a method for transmitting small data, comprising:
determining a first data volume, wherein the first data volume comprises a data volume of a Radio Resource Control (RRC) message and a data volume buffered by at least one Data Radio Bearer (DRB); and
determining whether to initiate inactive small data transmission based on the first data volume,
wherein the determining whether to initiate the inactive small data transmission based on the first data volume comprises:
determining to initiate the inactive small data transmission, if the first data volume is less than or equal to the first threshold and a channel quality measurement value measured by the terminal device is greater than or equal to a second threshold,
wherein the method further comprises:
receiving a system message sent by a network device,
wherein the system message comprises one data volume threshold and a plurality of channel quality thresholds, the one data volume threshold being the first threshold; and
the method further comprises:
comparing the first data volume with the data volume threshold;
if the first data volume is less than or equal to the data volume threshold, comparing the channel quality measurement value with the plurality of channel quality thresholds, and determining the second threshold that is less than or equal to the channel quality measurement value from the plurality of channel quality thresholds; and
indicating the second threshold to the network device.

6. The terminal device according to claim 5, wherein
the terminal device has N DRBs, where N is a positive integer; and
the method further comprises:
receiving RRC-specific signaling sent by the network device, wherein the RRC-specific signaling carries first indication information, and the first indication information is used for indicating that M DRBs among the N DRBs support the inactive small data transmission, where M is a positive integer less than or equal to N.

7. The terminal device according to claim 6, wherein the at least one DRB is the M DRBs.

8. The terminal device according to claim 5, wherein the data volume buffered by the at least one DRB comprises a data volume buffered by each DRB of the at least one DRB, and the data volume buffered by each DRB comprises PDCP buffer data volume and/or RLC buffer data volume.

9. A method for transmitting small data, comprising:
sending, by a network device, RRC-specific signaling to a terminal device, wherein
the terminal device is configured to determine a first data volume, wherein the first data volume comprises a data volume of a Radio Resource Control (RRC) message and a data volume buffered by at least one Data Radio Bearer (DRB);
the terminal device is further configured to determine whether to initiate inactive small data transmission based on the first data volume;
the terminal device has N DRBs, where N is a positive integer; and
the RRC-specific signaling carries first indication information, and the first indication information is used for indicating that M DRBs among the N DRBs support the inactive small data transmission, where M is a positive integer less than or equal to N,
wherein the terminal device is further configured to:
determine to initiate the inactive small data transmission, if the first data volume is less than or equal to the first threshold and a channel quality measurement value measured by the terminal device is greater than or equal to a second threshold,
wherein the method further comprises:
sending, by the network device, a system message to the terminal device,
wherein the system message comprises one data volume threshold and a plurality of channel quality thresholds, the one data volume threshold being the first threshold; and
the terminal device is further configured to:
compare the first data volume with the data volume threshold;
if the first data volume is less than or equal to the data volume threshold, compare the channel quality measurement value with the plurality of channel quality thresholds, and determine the second threshold that is less than or equal to the channel quality measurement value from the plurality of channel quality thresholds; and
indicate the second threshold to the network device.

10. The method according to claim 9, wherein the at least one DRB is the M DRBs.

11. The method according to claim 9, wherein the data volume buffered by the at least one DRB comprises a data volume buffered by each DRB of the at least one DRB, and the data volume buffered by each DRB comprises PDCP buffer data volume and/or RLC buffer data volume.

12. A network device, comprising: a processor and a memory, wherein the memory is configured to store a computer program, and the processor is configured to call and run the computer program stored in the memory to perform the method according to claim 9.

* * * * *